United States Patent
Baker

[11] 3,893,469
[45] July 8, 1975

[54] ROTARY PLUG VALVE

[75] Inventor: Joseph Winston Baker, Plainfield, N.J.

[73] Assignee: Brunswick Corporation, Skokie, Ill.

[22] Filed: Dec. 16, 1974

[21] Appl. No.: 532,873

Related U.S. Application Data

[63] Continuation of Ser. No. 278,467, Aug. 7, 1972, abandoned.

[52] U.S. Cl. ............... 137/584; 251/309; 251/315
[51] Int. Cl.² .................... F16K 5/06; F16K 27/06
[58] Field of Search .......... 251/309, 314, 315, 316, 251/317; 137/329, 329.01, 584

[56] References Cited
UNITED STATES PATENTS

| | | | |
|---|---|---|---|
| 1,801,361 | 4/1931 | Moore | 137/584 |
| 2,233,074 | 2/1941 | Corbin, Jr. | 251/312 X |
| 2,803,426 | 8/1957 | De Zurik | 251/309 X |
| 3,064,938 | 11/1962 | Knox | 251/315 X |
| 3,245,653 | 4/1966 | Lavigueur | 251/315 X |
| 3,494,589 | 2/1970 | Mumma | 251/298 |
| 3,528,448 | 9/1970 | Urban | 137/242 |

*Primary Examiner*—William R. Cline
*Attorney, Agent, or Firm*—John G. Heimovics; Donald S. Olexa; Sheldon L. Epstein

[57] ABSTRACT

An improved rotary plug valve is disclosed which is lighter and less costly than conventional valves and which permits easy service, removal and installation of the plug after the valve is welded in line. These benefits are the result of the novel structural relationship between an access port in the side wall of the main valve housing and the plug. The access port is made just slightly larger than the main flow cavity sealed by the plug and is located so that the plug's seal is completely exposed for service and inspection when the valve is in the open position. The plug, which is larger than the access port, is given a U-shaped configuration which permits it to pass through the access port.

10 Claims, 5 Drawing Figures

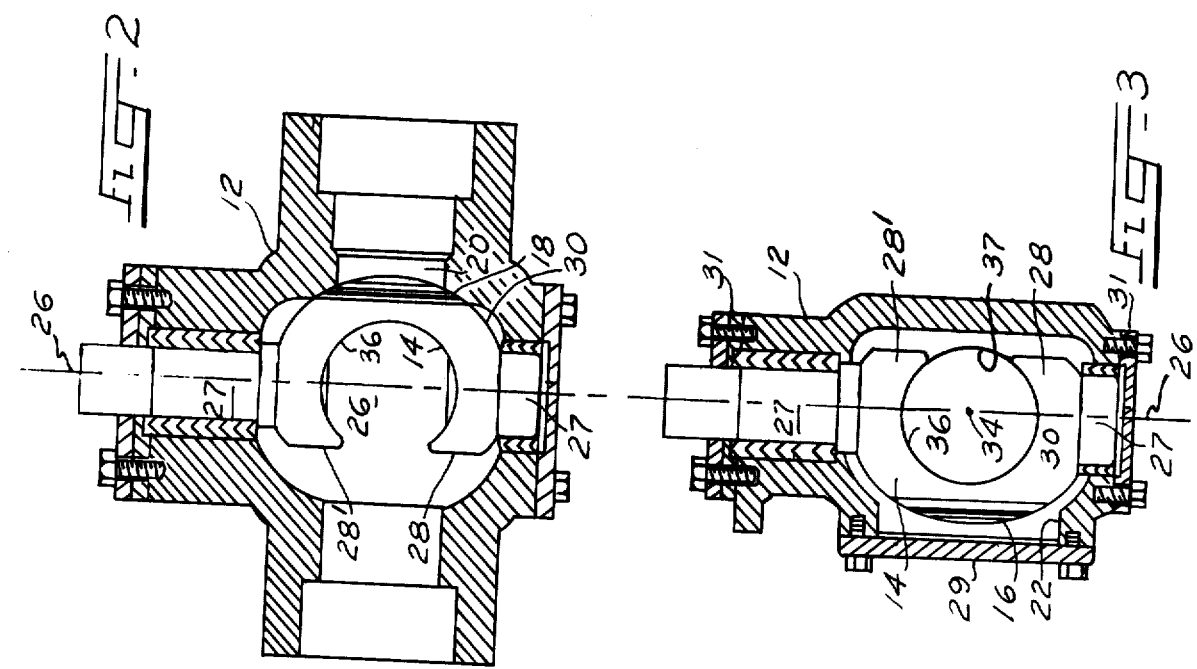
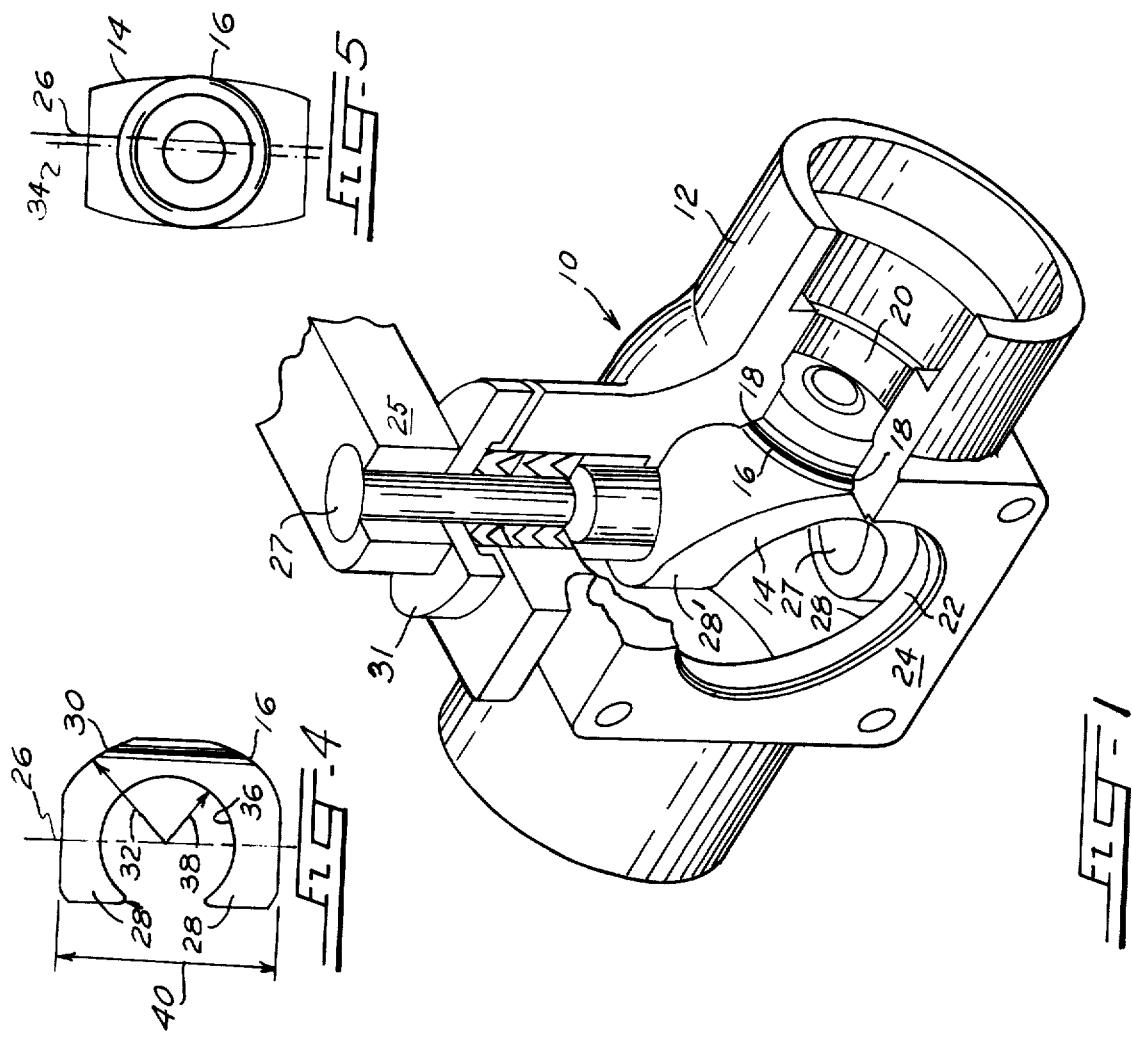

ROTARY PLUG VALVE

CROSS REFERENCE TO RELATED APPLICATION

This application is a continuation application of my copending application Ser. No. 278,467, filed Aug. 7, 1972, now abandoned.

FIELD OF INVENTION

This invention is in the field of rotary plug valves (U.S. Class 251—298) and, more particularly, is a segmented ball valve of markedly reduced weight for use in applications where high integrity rotary valves must be welded in line and yet be easily inspected and serviced such as nuclear boiler water service.

DESCRIPTION OF THE PRIOR ART

High integrity rotary plug valves are made by several manufacturers, the most prominent of which are compared in the Table below with an equivalent valve of this invention to be marketed under the Registered Trademark FLUID DYNAMICS.

TABLE

A COMPARISON OF ANSI 600 POUND CLASS, BUTT WELD END VALVES

| MANUFAC-TURER | VALVE SIZE | BORE INCHES | LENGTH INCHES | WEIGHT POUNDS |
|---|---|---|---|---|
| FLUID DYNAMICS | 3 | 2⅞ | 14 | 48 |
| Hills | 3 | 3 | 14 | 77 |
| Grove | 3 | 3 | 14 | 93 |
| Cameron | 3 | 3⅛ | 14 | 78 |
| FLUID DYNAMICS | 4 | 2⅞ | 17 | 77 |
| Hills | 4 | 3 | 17 | 101 |
| Grove | 4 | 3 | 17 | 125 |
| Cameron | 4 | 3 | 17 | 126 |

As the Table illustrates, the rotary plug valve of this invention is significantly lighter than other plug valves of its rating and capacity. Since the cost of a valve is directly related to its weight, the reduction in the mass of the housing translates into direct savings in manufacture.

A principal factor responsible for the savings of weight and cost of the rotary plug valve of this invention is the novel geometry of the housing and the rotary plug. By structuring the housing to include an access port of proper dimension and location for the installation, removal and service of the plug and by using a specially selected ball segment as the rotary plug which is configured to pass through the access port and mount on removable trunnions, the usual provisions made for installing and servicing plugs in welded-service valves can be eliminated along with their extra bulk and weight. These and other objects and advantages of this invention are more fully described in the following description of a preferred embodiment in which:

FIG. 1 is an isometric view of a rotary plug valve of this invention with the rotary plug in the valve's closed position;

FIG. 2 is a cross-sectional side view of the rotary plug valve of FIG. 1, with the rotary plug in the valve's closed position;

FIG. 3 is a cross-sectional end view of the rotary plug valve of FIGS. 1 and 2, with the rotary plug in the valve's open position;

FIG. 4 is a side view of the rotary plug used in the illustrated valve; and

FIG. 5 is an end view of the rotary plug of FIG. 4.

DESCRIPTION OF A PREFERRED EMBODIMENT

As shown in FIG. 1, a rotary plug valve 10 of this invention comprises a main valve housing 12, a rotary plug 14 in the form of a ball segment journaled within the housing to control fluid flow therethrough and a seal 16 mounted on the face of the plug for fluid-tight engagement against a sealing surface 18 surrounding main flow cavity 20 in the housing 12 when the valve is closed. A novel feature of this valve is the provision of access port 22 which permits easy inspection of the seal 16 and service, installation and removal of the plug once the housing 12 is welded into a line.

In other rotary plug valves, such as that shown in U.S. Pat. No. 3,379,408, a top bonnet of relatively large size is used to cover an access hole which is large enough so that the rotary plug can be installed and removed. Because the force on the bonnet is directly proportional to its size, a larger access hole requires a heavier bonnet which in turn must be secured with a greater number of bolts to a thicker housing. As the inside dimensions of the main flow cavity are dictated by the user, increasing the size of the access hole and bonnet causes a corresponding increase in the size and weight — and therefore cost — of the valve.

In contrast with presently used valves, the valves of this invention require access ports which are only 1.0–2.6 times greater in cross-sectional area than the cross-sectional area of the main flow cavity. Where the main flow cavity, the seal and the access port are circular in cross-section — as in the case in this illustrated embodiment — the access port diameter need only be 1.0–1.6 times greater than the main flow cavity diameter. In contrast, conventional valve access holes are at least twice the diameter or 4 times the cross-sectional area of the main flow cavity and this leads to the substantial increases in weight previously shown in the Table because the bonnet is subjected to at least 2½ times as much force.

In valves of this invention, the size of the access port 22 can be limited to small values through the proper placement of the access port and through the use of specially developed rotary plugs. As illustrated, the access port is located in a side wall 24 of the housing which is parallel with the plug's axis of rotation 26 and placed in such a position in that wall so that the seal is completely exposed through the access port when the plug is moved to the valve's open position. In this specific embodiment, the center of the access port is aligned with the plug's axis of rotation 26 and positioned such that the access port is concentric with the seal when the ball segment is moved to the valve's open position. This construction not only simplifies the process of inspecting and changing the seal (the access port now acts as a "template" in aiding the visual determination of whether the seal has become distorted), but it simplifies the task of inserting and removing the plug.

As shown in FIGS. 2 and 3, the rotary plug 14 is mounted on a pair of trunnions 27 within the housing 12. In this embodiment, both trunnions pass through the housing for easy removal; however, there may be some instances where only one trunnion need pass through the housing as the other one could be removed from the inside. In order to remove the plug 14, the plug is first rotated to the open position where the seal 16 is exposed through the port 22 when cover 29 is removed. Next the seal 16 can be removed to provide additional clearance for manuevering the plug. Then the trunnions 27 are withdrawn after removing retaining plates 31, thus leaving the plug free to move within the housing. By inserting his fingers through the access port, the maintenance man now can move the plug back to near its closed position. Once this is done, he can rotate the plug 90° in the clockwise direction (looking into the access port) until one ear 28 of the plug appears in behind the access port 22. By pulling the ear 28 through the port with a rotating and twisting movement, he can remove the plug. While this last step appears somewhat complicated in writing, an experienced maintenance man can remove a plug in less than 1 minute after he has withdrawn the trunnions. Installation, which is accomplished by reversing this procedure, is made foolproof by providing different keying patterns in the trunnions so that the plug can only be mounted one way. In contrast with prior art valves, such as top-entry models, it is not necessary to remove the power accuator to service the valve as top trunnion 27 passes through actuator arm 25.

The construction of the plug is an important aspect of this invention. As shown in FIGS. 4 and 5, the exterior surface 30 of the plug in this embodiment is approximately a segment of a sphere. A sphere segment, which contains an open gap between ears 28 and 28', is preferred over a complete ball not only because of its markedly lower manufacturing cost, but because it permits the use of a smaller access port.

Generally the radius of curvature 32 of the sphere or segment 14 will be about 2 times the radius of the main flow cavity 20 and the face of the plug will be just wide enough to accommodate the seal. The plug is journaled to revolve around trunnion axis 26 and as shown in FIGS. 3 and 5, the trunnion axis 26 is slightly offset from the axis 34 of the main flow cavity 20 so that the slight eccentric movement caused by the offset firmly locks the seal 16 against the sealing surface 18.

Although the contour of the exterior surface 30 of the plug is dictated by sealing considerations, the interior surface 36 construction is controlled by the required flow characteristics. The radius of curvature 38 of the interior surface of the plug should conform as closely as possible to the contour of the main flow cavity 20 to minimize flow resistance and pressure loss. In this embodiment wherein the main flow cavity 20 is circular in cross-section, the interior contour of the plug has approximately the same radius of curvature 38 as does the main flow cavity. Because of this, the height 40 of the plug — the distance between the exterior surfaces of ear 28 and ear 28' — is greater than the maximum transverse dimension (here the diameter) of the access port. This prevents the plug from being removed without manipulation so that care must be taken in specifying the interior of the main valve housing so that there is space to manuever the plug for removal.

FIG. 3 illustrates one other feature of this invention. When the valve is placed in the open position and viewed through the main valve cavity 20, it is seen that the valve has a straight-through flow path. This is important because a straight-through flow path eliminates turbulence and cavitation which would be observed as a pressure loss or as noise. The straight-through flow path is defined by the interior surface 36 of the plug segment and by interior surface 37 of the housing for that portion of the flow path not bounded by the interior surface of the plug. Also as shown in FIG. 3, there are no hidden pockets which could trap solid particles and cause sticking or jamming of the plug.

The valve which has served as the specific embodiment was developed for use in high-temperature, high-pressure nuclear reactor boiler service where it must be welded in its line. In other applications, variations in construction may be desirable.

For example, instead of placing the seal on the plug and providing a sealing surface in the housing, the reverse procedure may be of advantage — that is; the seal could be attached to the housing so as to surround the main valve cavity 20 at the place identified by the reference numerals 18 in FIG. 1 and the plug could be provided with a sealing surface on its face along the perimeter of the circle identified by the reference numeral 16. Another alternative construction does not contain a separate seal and depends on metal-to-metal contact between sealing surfaces on the plug and the body to make the valve fluid-tight. Here, special care is taken in displacing the axis of rotation 26 of the plug relative to the axis of the main flow cavity 34 so that there is sufficient eccentricity to provide a positive metal-to-metal seal. In other applications, variations in construction can be made which fully utilize the teachings of this invention as defined below.

What is claimed is:

1. In a rotary plug valve containing a main valve housing with a circular main flow cavity therein and a rotary plug to control fluid flow therethrough journaled on an axis of rotation within the main valve housing, the improvement comprising:
   a. a C-shaped rotary plug having two ears and a face, journaled on removable trunnions;
   b. circular seal means mounted on the face of the plug for fluid-tight engagement against a sealing surface surrounding the main flow cavity when the valve is in a closed position;
   c. a circular access port having a diameter that is smaller than the exterior ear-to-ear distance of the plug but large enough to permit insertion or removal of the plug by manipulation when the plug's trunnions and seal are removed and the plug is rotated from the closed position, having a cross-sectional area of 1.0–1.6 times greater than the cross-sectional area of the main flow cavity, and having a location in a side wall of the housing parallel to the fluid flow, the seal means being completely exposed through the port when the valve is in an open position;
   whereby the C-shaped rotary plug and its circular seal means may each be inspected, serviced, installed or removed through a single access port only 1.0–1.6 times greater in cross-sectional area than the cross-sectional area of the main flow cavity.

2. The valve of claim 1 wherein the seal means is singular.

3. The valve of claim 1 wherein one of the trunnions passes through the housing.

4. The valve of claim 1 wherein the access port is concentric with the seal means when the plug is moved to the valve's open position.

5. The valve of claim 1 wherein the plug's axis of rotation is displaced from the axis of the main flow cavity so that the plug effects a fluid-tight engagement with the housing through an eccentric motion of the plug relative to the surface of the housing surrounding the main flow cavity.

6. The valve of claim 1 wherein the plug is rotated 90° from the closed position for removal.

7. A rotary plug valve for controlling the flow of fluid therethrough, comprising:
 a. a main valve housing having a circular main flow cavity surrounded by a sealing surface;
 b. a C-shaped rotary plug having two ears and a face, journally mounted on removable trunnions on an axis of rotation within the housing and having a single circular seal means mounted on the face of the plug to effectuate fluid-tight engagement with the sealing surface surrounding the main flow cavity when the valve is in a closed position; and
 c. a circular access port having a diameter that is smaller than the exterior ear-to-ear distance of the plug but large enough to permit insertion or removal of the plug by manipulation when the plug's trunnions and seal are removed and the plug is rotated 90° from the closed position, having a cross-sectional area of 1.0–1.6 times greater than the cross-sectional area of the main flow cavity, and having a location in a side wall of the housing parallel to the fluid flow, the seal means being completely exposed through the port when the valve is in an open position;
whereby the C-shaped rotary plug and its circular seal means may each be inspected, serviced, installed, or removed through a single access port only 1.0–1.6 times greater in cross-sectional area than the cross-sectional area of the main flow cavity.

8. A rotary plug valve for controlling the flow of fluid therethrough, comprising:
 a. a main valve having a circular main flow cavity therein;
 b. a C-shaped rotary plug having two ears and a face, journally mounted on removable trunnions on an axis of rotation within the housing and having a single circular seal means mounted on the face of the plug; and
 c. a circular access port having a diameter that is smaller than the exterior ear-to-ear distance of the plug but large enough to permit insertion or removal of the plug by manipulation when the plug's trunnions and seal are removed and the plug is rotated from the closed position, having a cross-sectional area of 1.0–1.6 times greater than the cross-sectional area of the main flow cavity, and having a location in a side wall of the housing parallel to the fluid flow, the seal means being completely exposed through the port when the valve is in an open position.

9. The valve of claim 8 wherein one of the trunnions passes through the housing.

10. The valve of claim 8 wherein the plug's axis of rotation is displaced from the axis of the main flow cavity so that the plug effects a fluid-tight engagement with the housing through an eccentric motion of the plug relative to the surface of the housing surrounding the main flow cavity.

* * * * *